United States Patent
Andrich et al.

(10) Patent No.: US 10,344,754 B2
(45) Date of Patent: Jul. 9, 2019

(54) IMPROPER OPENING DETECTION METHOD OF MULTIPLE SUCTION RECIPROCATING COMPRESSOR SUCTION VALVE

(71) Applicant: Whirlpool S.A., Sao Paulo (BR)

(72) Inventors: Roberto Andrich, Joinville (BR); Daniel De Figueiredo Maria, Joinville (BR)

(73) Assignee: Embraco-Industria De Compressores E Solucoes Em Refrigeracao Ltda., Joinville (BR)

( * ) Notice: Subject to any disclaimer, the term of this patent is extended or adjusted under 35 U.S.C. 154(b) by 115 days.

(21) Appl. No.: 15/512,123

(22) PCT Filed: Sep. 21, 2015

(86) PCT No.: PCT/BR2015/050159
§ 371 (c)(1),
(2) Date: Mar. 17, 2017

(87) PCT Pub. No.: WO2016/044911
PCT Pub. Date: Mar. 31, 2016

(65) Prior Publication Data
US 2018/0230991 A1    Aug. 16, 2018

(30) Foreign Application Priority Data
Sep. 22, 2014    (BR) ................. BR1020140234756

(51) Int. Cl.
*F04B 53/10*    (2006.01)
*F04B 49/03*    (2006.01)
(Continued)

(52) U.S. Cl.
CPC ............. *F04B 49/03* (2013.01); *F04B 35/04* (2013.01); *F04B 39/08* (2013.01); *F04B 39/10* (2013.01);
(Continued)

(58) Field of Classification Search
CPC .......... F04B 35/04; F04B 49/03; F04B 51/00; F04B 53/10
(Continued)

(56) References Cited

U.S. PATENT DOCUMENTS 10,094,374 B2 * 10/2018 Andrich .................. F04B 51/00
2014/0345713 A1 * 11/2014 Pirovano ............ F04B 39/1073
  137/516.11
2016/0003238 A1 * 1/2016 Andrich ................ F04B 7/0076
  73/168

FOREIGN PATENT DOCUMENTS

JP    4123893    7/2008
JP    4175912 B2    11/2008
(Continued)

Primary Examiner — Eric S. McCall
(74) Attorney, Agent, or Firm — Harrington & Smith

(57) ABSTRACT

A method for detecting an improper opening of a multiple suction reciprocating compressor suction valve of a reciprocating compressor includes monitoring, by an electronic processing core, a variable proportional to torque of an electrical engine that cooperates with a piston of the reciprocating compressor, the variable being measured by a sensor. A detection of the improper opening of the suction valve is made by a detection of at least one peak of the variable proportional to torque of the electrical engine during power of the electromagnetic field generator element.

4 Claims, 2 Drawing Sheets

(51) Int. Cl.
*F04B 35/04* (2006.01)
*F04B 39/08* (2006.01)
*F04B 39/10* (2006.01)
*F04B 49/02* (2006.01)
*F04B 49/06* (2006.01)
*F04B 49/10* (2006.01)
*F04B 51/00* (2006.01)
*G01M 15/04* (2006.01)

(52) U.S. Cl.
CPC .......... *F04B 39/1073* (2013.01); *F04B 49/02* (2013.01); *F04B 49/06* (2013.01); *F04B 49/10* (2013.01); *F04B 51/00* (2013.01); *G01M 15/044* (2013.01); *F04B 2201/0603* (2013.01); *F04B 2203/0201* (2013.01); *F04B 2203/0202* (2013.01); *F04B 2203/0207* (2013.01); *F04B 2203/0208* (2013.01); *F04B 2203/0209* (2013.01)

(58) Field of Classification Search
USPC .......................................... 73/114.15, 862.08
See application file for complete search history.

(56) References Cited

FOREIGN PATENT DOCUMENTS

| WO | WO 2014/124507 A1 | 8/2014 |
| WO | WO 2014/124508 A1 | 8/2014 |

\* cited by examiner

IMPROPER OPENING DETECTION METHOD OF MULTIPLE SUCTION RECIPROCATING COMPRESSOR SUCTION VALVE

FIELD OF THE INVENTION

The invention related referees to an improper opening detection method of the suction valve from the double suction reciprocating compressor and, particularly, semi controlled valve, reed valve type, disposed on the head set of a double suction reciprocating compressor.

Generally, it is the core of present invention verifies the improper opening of suction valve in real time, without adding sensors or equivalents, by way of physical and/or electrical parameters observed on electrical engine which move the compression elements of reciprocating compressor.

BACKGROUND OF THE INVENTION

As it is known by specialists on the art, reciprocating compressors comprise fundamental electromechanical equipment composed by an electrical engine, a compression mechanism and at least one electronic central, all this equipment being disposed inside a hermetic casing. Generally, the compression mechanism is basically integrated by a piston, by a cylinder and by a head.

The piston is somehow, mechanically linked to the electrical engine, wherein this way of linking is capable of transform the rotational movement of electrical engine in linear reciprocating movement of the piston. The cylinder comprises the environment wherein the piston is reciprocated. The head comprises the mechanical set that controls the work fluid flow.

Broadly, a reciprocating compressor head comprises at least an exhaust port and at least one suction port, as well as at least one exhaust valve and a suction valve. As it is known, the main function of the valves relates to fluid flow control which flows in one of the ports, thus, the suction valve controls the fluid flow which is admitted inside the cylinder thought the suction port, and the exhaust valve controls the fluid flow that exits the cylinder through the exhaust port. Thus, it is noted that efficiency of a reciprocating compressor is, among other features, regulated by correct functioning of the valves from compression mechanism head.

Different positioning check or improper reciprocating compressor valve opening systems and/or methods are well known by the specialists on the art. Generally, such systems and/or methods have the aim check if the valves are actuating as expected, this is, if the valves seal their ports when this seal is necessary, or if the valves unblock its ports when the fluid flow is necessary.

Obviously, the specific features of the already known systems and/or methods for checking integrity of the reciprocating compressor valve are related to valves constructiveness whose integrity is desired to be checked. In case of reed valves (metallic blades disposed over or under a port, in way to seal or unblock it according to the fluid flow way), for example, and as described in document BR1020130035599, filed on Feb. 15, 2013 by the Applicant, is provided a system and method of checking the reciprocating compressor valve operational state. The system and method described on said document BR1020130035599 need to use at least one inductive component, at least one sensor and at least one data processing core. Thus, the inductive component, being is capable of induce electromagnetic field whose intensity ranges according to the relative vicinity to metallic valve, is capable of stimulating, proportionally and stepwise, the sensor, being the signal acquired by the sensor directly proportional to the valve opening or closure. Although the system and method described on said document BR1020130035599 are functional, it is noted that is necessary use specific additional elements that can increase the production cost of the reciprocating compressor.

On the other hand, document JP04123893, filed on Oct. 15, 2002, describes a screw compressor that foresee automated interruption of electrical current of its electrical engine from checking determined movement of one of its valves, wherein movement information (or instant positioning) of said valve is acquires by means of electrical current variation of the engine. Generally, the system described on this document has the function to turn off the engine of the compressor in fault mode generated by the valve.

Furthermore, document JP04175912, filed on Feb. 17, 2003, a control method of car air-conditioning system compressor capable of check possible abnormalities on exhaust cycles through power amplitude against electromotive found on compressor engine. Specially, power variation against electromotive is seen by means of monitoring the tension terminal of the responsible circuit by engine electrical power (frequency inverter) during engine shutdown, being said power against electromotive generated by abnormalities on the compressor exhaust valve. It is based on this scenario that the present invention arises.

OBJECTIVES OF THE INVENTION

Thus, it is a fundamental objective of the concerned invention reveal a simple and functional method capable of detect, in real time, improper opening of a high pressure valve during low pressure suction cycle in a double or multiple suction reciprocating compressor, as shown on document BRPI10013598, filed on Apr. 26, 2010, and on document BR1020140072594, filed on Mar. 26, 2014.

This way, it is an objective of the invention to use data related to parameters connected to the electrical engine torque of compressor as main information to detect eventual improper opening of the suction valve.

Accordingly, it is a further objective of the concerned invention not to use additional component so the improper opening detection method of the valve can be executed.

SUMMARY OF THE INVENTION

The aforementioned objectives are fully reached by means of improper opening detection method of the suction valve of the multi-suction reciprocating compressor.

According to the present invention, said compressor (in which the method is applied) comprises at least one compression mechanism comprising at least on compression cylinder, at least one piston capable of perform reciprocating linear movement inside the cylinder, and at least one "valve-port" set fluidly linked to the compression cylinder integrated by at least one suction port, at least one actuating suction valve to its respective suction port and at least one electromagnetic field generator element capable of selectively interact with the suction valve. Furthermore, it is also foreseen, obviously, at least one electrical engine cooperating with said piston, at least one electronic central of processing and at least one sensor capable of measure at least one variable proportional to torque of said electrical engine.

Improper opening detection method of the suction valve, as itself, stands out by the fact that electronic central of processing monitor at least one variable proportional to torque of said electrical engine by means of sensor capable of measure at least one variable proportional to torque of said electrical engine, being the improper opening detection of the suction valve made from the detection of at least one peak of said variable proportional to torque of said electrical engine during powering of the electrical field generator element.

DETAILED DESCRIPTION OF THE INVENTION

Figure 1A:
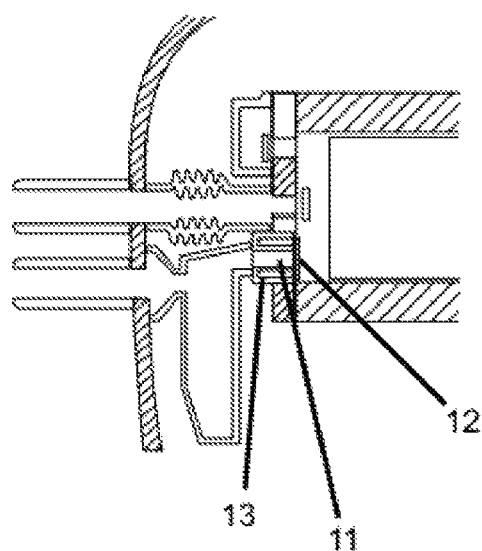
FIGS. 1A and 1B illustrates mere conceptual examples of part of the compression mechanisms of double or multiple suction reciprocating compressors.

As shown on FIG. 1A, from document BRPI10013598, current state of the art comprises double or multiple suction compressors, in which comprises one single compression mechanism capable of operate, exclusively, with one among at least two suction lines of different pressures.

Thus, such compression mechanism comprises at least two suction sets and integrated, each one, by a actuating suction valve coopering with its respective suction port and at least one exhaust set.

Figure 1B:
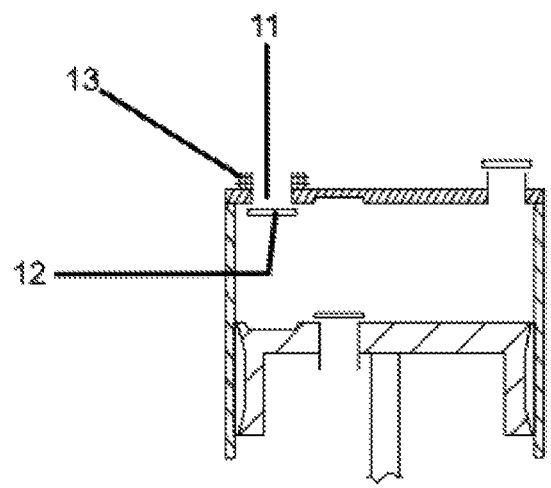

In case of document BRPI10013598, both suction sets are disposed in one single plate-valve belonging to the compression mechanism. In case of document BR1020140072594, both suction sets are disposed in distinct components of the compression mechanism, as exemplified on FIG. 1B, where one of the suction sets is disposed on the compression cylinder of reciprocating compressor, as the other suction set is disposed on the plate-valve of reciprocating compressor.

Independently of the physical location of suction sets (so called), it is noted that one of them is also integrated by an electromagnetic field generator element capable of help and/or hinder switch of the suction valve operation state, allowing said suction valve to be electronically actuated (by electromagnetic field generator element) and/or automatically actuated (by pressure differential of compression chamber.

The valve in which suction set is free of any type of electromagnetic field generator element is normally named automatic valve (or "low valve"), after all, it has its operational state altered only depending on the pressure differential of the compression chamber. The valve in which the suction set is integrated by the electrical field generator element (electrical coil) is normally named semi controlled (or "high valve"), finally, it has its operational state altered automatically and/or controlled.

From a functional point of view, and according to detailed description on documents BRPI10013598 and BR1020140072594, it is noted that the "low valve" and "high valve" operate exclusively, this is, they do not operate simultaneously.

Therefore, when it is desired to select (work with) the "high valve", it is just not actuate the electrical field generator element. In this circumstance, the pressure of the suction line itself (high pressure) keeps the "high valve" open and, additionally, a "low valve" closed.

On the other hand, when it is desired to select (work with) the "low valve", simply press the electromagnetic field generator element. In this circumstance, the magnetic field generated by this element makes the "high valve" to be attracted obstructing its suction port, blocking its suction line (high pressure) and allowing the other suction line (low pressure) to keep the "low valve" opened related to its suction port.

However, it is possible that the pressure of the suction line (high pressure) of "high valve" is greater than the attraction strength produced by the electromagnetic field generator element. In this case, there is a possibility of the "high valve" open during a low pressure suction cycle (when it is desired to work just with the "low valve").

This problem or malfunctioning—caused by improper opening of the "high valve"—is extremely harmful to compressor efficiency, besides damaging the concept of double or multiple suction, after all, the improper opening of the "high valve" interrupts unduly the operation of "low valve".

Thus, and having in mind the importance of checking the improper opening of the "high valve", it is presented the method of the invention, which has the objective to detect the improper opening of the suction valve from the multiple section reciprocating compressor.

Preliminarily, It remains clear that the subject method is specially dedicated to reciprocating compressions integrated by a compression mechanism basically composed by a compression cylinder, a piston capable of make reciprocating linear movement inside the cylinder, and at least one "valve-port" set that, fluidly associated with the compression cylinder, is integrated by at least one suction port 11, at least one suction valve 12 actuating cooperatively with its respective suction port 11, and an electromagnetic field generator element 13 capable of selectively interact with the suction valve 12. Possible embodiments of this compression mechanisms are shown on FIGS. 1A and 2B.

Obviously, said reciprocating compressor is further integrated by electrical engine (not shown) cooperating with said piston and at least one electronic central of processing (not shown). As above mentioned, reciprocating compressor capable of "receive" the method revealed comprises a compressor already known by specialist on the art.

In this scenario, stands out the present invention because it proposes a method in which monitoring is made by at least one variable proportional to torque of said electrical engine by means of at least one sensor electrically connected to electronic central of processing, wherein the improper opening detection of the suction valve 12 made from detection of at least one peak of said variable proportional to torque of said electrical engine during electromagnetic field generator element 13 energization.

In this way, it is worth to say that said sensor capable of measure at least one variable proportional to torque of said electrical engine can comprise, in example, the own engine, a shunt resistor, a resistive voltage divider, among other sensors already known and, eventually, called "sensorless".

According to the invention concerned, the variable proportional to torque of said electrical engine comprises an electrical current that runs by at least one of the coils from electrical engine. Specifically, the variable proportional to torque of said electrical engine comprises the electrical engine electric power.

Figure 2:
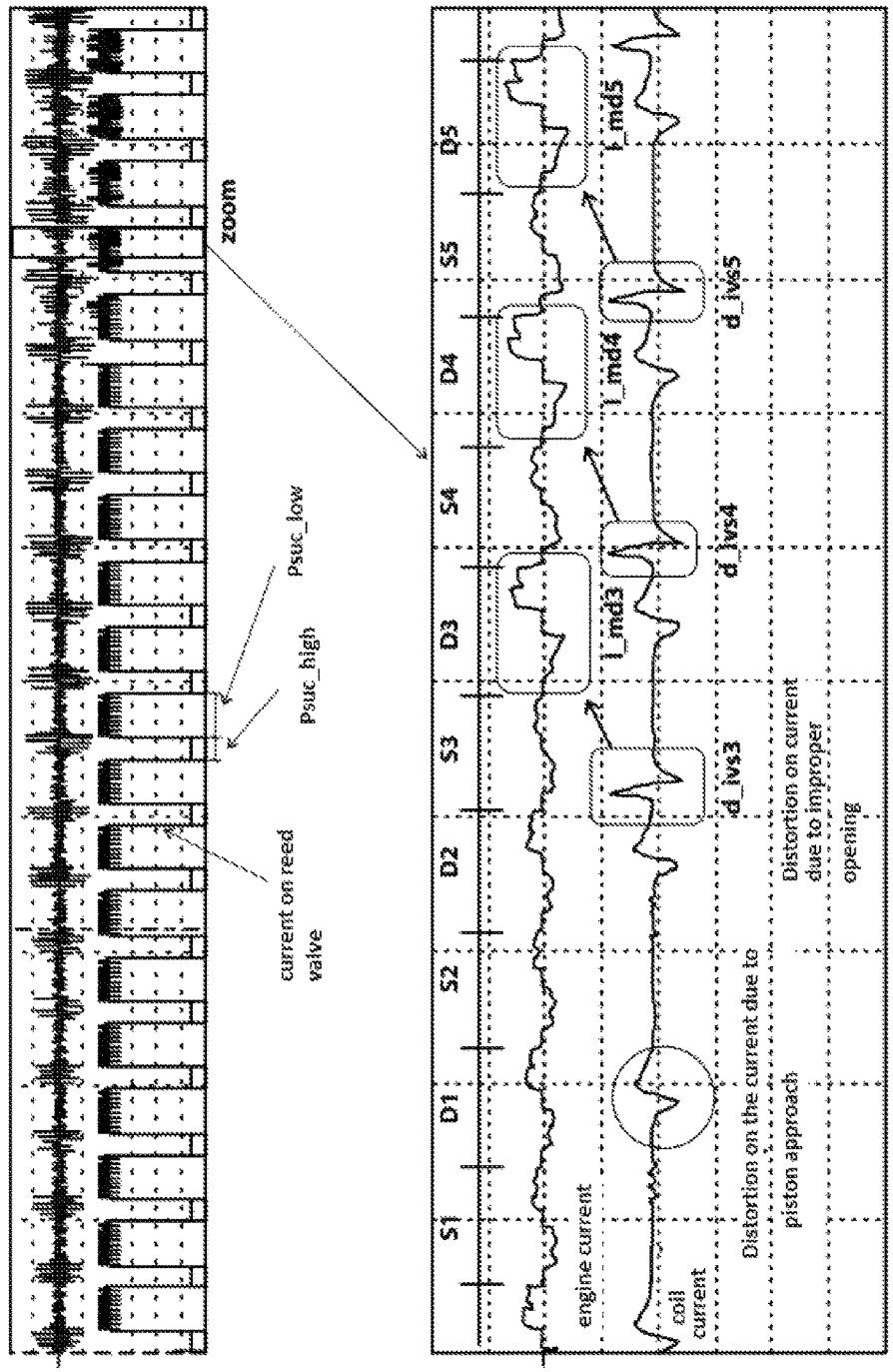
FIG. 2 shows a relational graphic between the high pressure suction valve state and the engine electrical current of the double and multiple suction reciprocating compressor.

The proposed method is better understood based on FIG. 2.

In this figure it is observed that during mechanical laps from low pressure suction, formed by suction and exhaust cycles S1D1, S2D2, S3D3 the engine current presents certain level. In this condition the valve is properly closed. In occurring an improper opening, indicated by disturb d_ivs3 on the coil current during the suction cycle S3, the gas of high pressure encroaches the barrel and causes a significant increase on the engine current during compression cycle D3 indicated by l_md3.

The current during this compression cycle is pointedly higher than the current from previous compression cycles D1, D2 in which the valve was closed. This sudden increase on the current during the functioning of low pressure can be used as indication of valve improper opening.

Still on the figure, other improper openings d_ivs4, d_ivs5 occur on suction cycles S4, S5 and cause the currents to increase l_md4, l_md5 during the following exhaust cycles D4, D5.

Thus, can be seen that the peak of said variable proportional to torque of said electrical engine occurs on the compression cycle immediately after the suction cycle in which occurred valve improper opening.

The variable of electrical engine monitored comprises the speed when occurs the improper opening of suction valve the engine speed will present a peak (negative).

The advantages of proposed method related to the technics already known—capable of reach the same result—is the fact that do not need further sensor of valve coil current, once its uses the engine current for the same function.

The invention claimed is:

1. Method of detecting improper opening of a multiple suction reciprocating compressor suction valve of a reciprocating compressor, the reciprocating compressor comprising:

at least one compression mechanism comprising at least one compression cylinder, at least one piston configured for reciprocating linear movement inside the cylinder, at least one "valve-port" set fluidly coupled to the compression cylinder integrated by at least one suction port, at least one actuating suction valve cooperating with its respective suction port, and at least one electrical magnetic generator element configured to interact selectively with the suction valve;

an electrical engine cooperating with said piston;

at least one electronic processing core; and at least one sensor configured to measure at least one variable proportional to torque of said electrical engine;

the method characterized by monitoring, by the electronic processing core, the at least one variable proportional to torque of said electrical engine measured by the sensor;

wherein the detection of improper opening of the suction valve is made by the detection of at least one peak of said variable proportional to torque of said electrical engine during power of the electromagnetic field generator element.

2. Method, of claim 1, wherein the variable proportional to torque of said electrical engine comprises the electrical current that runs by a coil of the electrical engine.

3. Method, of claim 1, wherein the variable proportional to torque of said electrical engine comprises the electrical power of the electrical engine.

4. Method, of claim 1, wherein the variable proportional to torque of said electrical engine monitored comprises the speed of the engine resulting from the improper opening of suction valve.

* * * * *